United States Patent
Pschirer et al.

(10) Patent No.: US 11,519,597 B2
(45) Date of Patent: Dec. 6, 2022

(54) MULTIPLE COOLED SUPPORTS FOR HEAT EXCHANGE TUBES IN HEAT EXCHANGER

(71) Applicant: General Electric Company, Schenectady, NY (US)

(72) Inventors: James Pschirer, Enfield, CT (US); Jeffrey Frederick Magee, Longmeadow, MA (US); Scott William Herman, Enfield, CT (US); Steven Wolfenden, Baden (CH)

(73) Assignee: General Electric Company, Schenectady, NY (US)

( * ) Notice: Subject to any disclaimer, the term of this patent is extended or adjusted under 35 U.S.C. 154(b) by 559 days.

(21) Appl. No.: 16/677,774

(22) Filed: Nov. 8, 2019

(65) Prior Publication Data

US 2021/0140628 A1    May 13, 2021

(51) Int. Cl.
*F22B 17/18*    (2006.01)
*F16B 17/00*    (2006.01)
(Continued)

(52) U.S. Cl.
CPC .............. *F22B 17/18* (2013.01); *F16B 17/00* (2013.01); *F28D 1/05341* (2013.01); *F28D 7/082* (2013.01); *F28F 9/26* (2013.01)

(58) Field of Classification Search
CPC .............. F22B 17/18; F28D 7/082; F28F 9/26
See application file for complete search history.

(56) References Cited

U.S. PATENT DOCUMENTS

| 2,045,145 A | * | 6/1936 | Jacobus | ..................... F22G 7/14 |
| | | | | 122/303 |
| 2,067,669 A | * | 1/1937 | Kerr | .......................... F22G 7/14 |
| | | | | 165/162 |

(Continued)

FOREIGN PATENT DOCUMENTS

| DE | 8305989 A1 | 8/1984 |
| EP | 1662198 A1 | 5/2006 |

(Continued)

OTHER PUBLICATIONS

DE3305989A1—machine translation (Year: 1983).*
European Search Report for corresponding EP Application No. 20205566.1, dated Feb. 22, 2021.

*Primary Examiner* — Nathaniel Herzfeld
(74) *Attorney, Agent, or Firm* — James Pemrick; Charlotte Wilson; Hoffman Warnick LLC

(57) ABSTRACT

A heat exchanger includes a casing configured to direct a working fluid therethrough, and at least one heat exchanger (HE) section in the casing. Each HE section includes a pair of spaced supports. The spaced supports include: an upstream support and a downstream support with at least one of them including a coolant carrying body configured to direct a coolant therethrough. A first cross-support couples to and extends between respective upstream and downstream supports; and at least one second cross-support couples to and extends between the respective upstream and downstream supports. Cross-supports are vertically distanced from adjacent cross-supports. A plurality of tube positioners coupled to each cross-support position a plurality of heat exchange tubes extending across a working fluid path through the casing. The tube positioners and the cooling of the cross-supports allows ferritic material to be used for once-through, duct-fired HRSGs.

19 Claims, 7 Drawing Sheets

(51) Int. Cl.
*F28D 1/053* (2006.01)
*F28D 7/08* (2006.01)
*F28F 9/26* (2006.01)

(56) References Cited

U.S. PATENT DOCUMENTS

| | | | | |
|---|---|---|---|---|
| 3,447,602 | A | * | 6/1969 | Dalin .................. F28F 9/26 |
| | | | | 165/145 |
| 3,896,874 | A | * | 7/1975 | Bongaards ............. F22B 37/24 |
| | | | | 165/162 |
| 4,262,705 | A | * | 4/1981 | Skinner .................. F22B 37/20 |
| | | | | 138/108 |
| 4,733,722 | A | * | 3/1988 | Forbes ..................... F28F 9/00 |
| | | | | 165/158 |
| 5,461,864 | A | | 10/1995 | Betta et al. |
| 5,799,623 | A | | 9/1998 | Born et al. |
| 7,275,503 | B2 | | 10/2007 | Wasada et al. |
| 9,696,098 | B2 | * | 7/2017 | Magee .................. F28F 9/0131 |
| 9,989,320 | B2 | | 6/2018 | Lech et al. |
| 10,274,192 | B2 | | 4/2019 | Truong et al. |
| 10,442,999 | B2 | | 10/2019 | Gull |
| 2008/0282997 | A1 | * | 11/2008 | Gayheart .................. F22D 1/02 |
| | | | | 122/441 |
| 2011/0048010 | A1 | * | 3/2011 | Balcezak ................ F01D 25/30 |
| | | | | 60/645 |
| 2013/0180471 | A1 | * | 7/2013 | Truong .................. F22B 15/00 |
| | | | | 122/1 B |
| 2013/0180696 | A1 | | 7/2013 | Magee et al. |
| 2017/0010053 | A1 | | 1/2017 | Shenoy et al. |
| 2020/0284426 | A1 | * | 9/2020 | Magee ..................... F15D 1/04 |

FOREIGN PATENT DOCUMENTS

| | | |
|---|---|---|
| KR | 101726476 | 4/2017 |
| WO | 2015001666 A1 | 8/2015 |
| WO | 2016168191 A1 | 10/2016 |

\* cited by examiner

MULTIPLE COOLED SUPPORTS FOR HEAT EXCHANGE TUBES IN HEAT EXCHANGER

BACKGROUND

The disclosure relates generally to heat exchangers and, more particularly, to a heat exchanger with multiple cooled supports for heat exchange tubes, and a once-through, duct-fired heat recovery steam generator that uses the heat exchanger.

Heat exchangers are used in a wide variety of industrial machines. In combined cycle power plants (CCPPs), for example, a heat exchanger in the form of a heat recovery steam generator (HRSG) converts heat from the exhaust of a gas turbine (GT) system to create steam for a steam turbine system and/or hot water for cogeneration equipment. HRSGs provide heat exchange tubes through which water and/or steam pass to be heated by the passing exhaust gases. The heat exchange tubes are formed into an array using a number of tube positioners that are supported within a casing, e.g., from the headers, manifolds, etc. The tube positioners position the tubes into tube sheets. The tube positioners are coupled such that each tube support supports the respective tube support below. Hence, a tube positioner near the top of the configuration carries more load than one near the bottom. In conventional once-through HRSGs, the tube supports are typically made of a ferritic material.

It is oftentimes desirable to further heat the working fluid passing through a heat exchanger. For example, the exhaust gases from the GT system may be heated prior to entry into a once-through HRSG to improve the efficiency of the HRSG and the CCPP. The heating may be referred to as 'supplementary heating,' or the HRSG may be referred to as 'once-through, duct-fired HRSG', because the heating occurs in a duct between the output of the GT system and the HRSG.

The supplemental heating presents a number of challenges for current once-through HRSGs. For example, the increased heat level increases the temperature and the corrosiveness of the gas flow such that the typically-used ferritic material (e.g., steel) may not withstand the environment for the desired lifespan. To address this issue, the ferritic material must be hardened against the harsher environment at greatly increased costs. Alternately, higher grade or austenitic material (such as Inconel alloys) may be used to attain the desired lifespans. Unfortunately, the additional material cost and increased manufacturing complexity eliminates the value added from the increased efficiency of the supplemental heating for a once-through HRSG.

In addition to corrosion challenges, in common vertically oriented HRSGs, different tube supports may experience different thermal and mechanical stresses. For example, the upstream ends of the upper tube supports experience high load and high temperatures that may shorten lifespan. No cooling is provided in current arrangements.

BRIEF DESCRIPTION

A first aspect of the disclosure provides a heat exchanger, comprising: a casing configured to direct a working fluid therethrough; at least one heat exchanger (HE) section in the casing, each HE section including a pair of spaced supports, each spaced support including: an upstream support and a downstream support, wherein at least one of the upstream support and the downstream support includes a coolant carrying body configured to direct a coolant therethrough; a first cross-support coupled to and extending between respective upstream and downstream supports; at least one second cross-support coupled to and extending between the respective upstream and downstream supports, each second cross-support of the at least one second cross-support vertically distanced from an adjacent cross-support thereabove; and a plurality of tube positioners suspended from each cross-support, each tube positioner positioning a plurality of heat exchange tubes extending across at least a portion of a working fluid path through the casing.

A second aspect of the disclosure provides a once-through, duct-fired heat recovery steam generator (HRSG) of a combined cycle power plant, the once-through HRSG comprising: a casing configured to direct a working fluid therethrough; a plurality of laterally adjacent heat exchanger (HE) sections configured to span a substantial portion of the working fluid path, each HE section including a pair of spaced supports, each spaced support including: an upstream support and a downstream support, wherein at least one of the upstream support and the downstream support includes a coolant carrying body configured to direct a coolant therethrough; a first cross-support coupled to and extending between respective upstream and downstream supports; at least one second cross-support coupled to and extending between the respective upstream and downstream supports, each second cross-support of the at least one second cross-support vertically distanced from an adjacent cross-support thereabove; and a plurality of tube positioners suspended from each cross-support, each tube positioner positioning a plurality of heat exchange tubes extending across at least a portion of a working fluid path through the casing, wherein each tube positioner positions a plurality of heat exchange tubes in a vertical plane, and wherein each pair of spaced supports, the cross-supports, and the plurality of tube positioners are made of a ferritic material.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
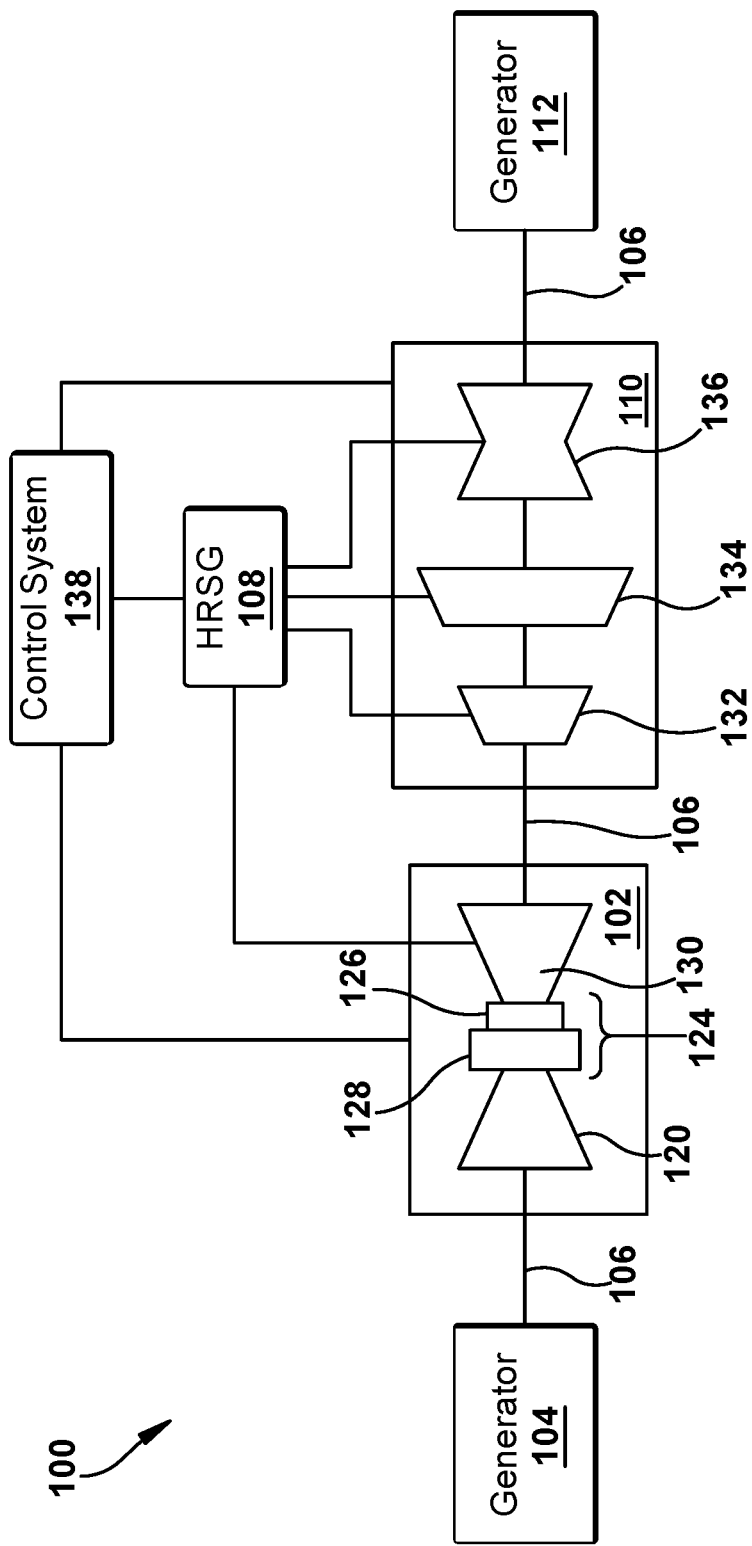
FIG. 1 shows a schematic view of an illustrative combined cycle power plant for a heat exchanger, according to embodiments of the disclosure.

It is noted that the drawings of the disclosure are not necessarily to scale. The drawings are intended to depict only typical aspects of the disclosure and therefore should not be considered as limiting the scope of the disclosure. In the drawings, like numbering represents like elements between the drawings.

DETAILED DESCRIPTION

As an initial matter, in order to clearly describe the current technology, it will become necessary to select certain terminology when referring to and describing components within an illustrative application in the form of a combined cycle power plant and parts thereof. To the extent possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as a working fluid through the turbine engine or, for example, the flow of hot gas through a heat exchanger. The term "downstream" corresponds to the direction of flow of the fluid, and the term "upstream" refers to the direction opposite to the flow. The terms "forward" and "aft," without any further specificity, refer to directions, with "forward" referring to the front or compressor end of the engine, and "aft" referring to the rearward or turbine end of the engine.

It is often required to describe parts that are located at differing radial positions with regard to a center axis. The term "radial" refers to movement or position perpendicular to an axis. In cases such as this, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. The term "axial" refers to movement or position parallel to an axis. Finally, the term "circumferential" refers to movement or position around an axis. It will be appreciated that such terms may be applied in relation to the center axis of the turbine.

In addition, several descriptive terms may be used regularly herein, as described below. The terms "first", "second", and "third" may be used interchangeably to distinguish one component from another and are not intended to signify location or importance of the individual components.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Where an element or layer is referred to as being "on," "engaged to," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

As indicated above, the disclosure provides a heat exchanger with multiple cooled supports for heat exchange tubes. The heat exchanger includes a casing configured to direct a working fluid therethrough. At least one heat exchanger (HE) section is in the casing. Each HE section includes a pair of spaced supports, including an upstream support and a downstream support. At least one of the upstream support and the downstream support includes a coolant carrying body configured to direct a coolant therethrough. A first cross-support is coupled to and extends between respective upstream and downstream supports. In contrast to conventional heat exchangers that have the one cross-support carry the load of each vertically oriented heat exchange tube sheet, embodiments of the disclosure provide at least one second cross-support coupled to and extending between the respective upstream and downstream supports. Each second cross-support is vertically distanced from an adjacent cross-support thereabove.

A plurality of tube positioners, e.g., tube sheets, are suspended from each cross-support, thus distributing the load of the heat exchange tubes over a number of cross-supports. Each tube positioner positions a plurality of heat exchange tubes extending across at least a portion of a working fluid path through the casing. Each cross-support carries some portion of the vertical load of the tube positioners, rather than a single cross-support bearing the entire load. Any thermal expansion that would normally damage a conventional arrangement exposed to supplemental heating is spread through the different segments and is limited by the cooling of the spaced supports. Hence, the segmentation of the supports for the vertically arranged tube positioners with the cooled, spaced supports allows the heat exchanger to be used in the hotter environments of a once-through, duct-fired HRSG.

Turning to FIG. 1, a heat exchanger according to embodiments of the disclosure will be described relative to an illustrative application in the form of a combined cycle power plant (CCPP) 100. FIG. 1 shows a schematic view of CCPP 100. It is emphasized that the teachings of the disclosure are applicable to any heat exchanger. CCPP 100 may include a gas turbine (GT) system 102 operably connected to a generator 104, and a steam turbine (ST) system 110 operably coupled to another generator 112. Generator 104 and GT system 102 may be mechanically coupled by a shaft 106, which may transfer energy between a drive shaft (not shown) of GT system 102 and generator 104. In the illustrative application, CCPP 100 is a single shaft system with two generators, but one with skill in the art will readily understand that the teachings of the disclosure are applicable to any variety of combined cycle power generating system.

Also shown in FIG. 1, a heat exchanger 108 in accordance with embodiments of the disclosure is operably connected to GT system 102 and ST system 110. As will be described in greater detail herein, heat exchanger 108 may take the form of a heat recovery steam generator (HRSG). Heat exchanger 108 may be fluidly connected to both GT system 102 and ST system 110 via conventional conduits (numbering omitted).

It is understood that generators 104, 112 and shaft 106 may be of any size or type known in the art and may differ depending upon their application or the system to which they are connected. Common numbering of the generators and shafts is for clarity and does not necessarily suggest these generators or shafts are identical.

GT system 102 may include a compressor 120 and a combustor 124. Combustor 124 includes a combustion region 126 and a fuel nozzle assembly 128. GT system 102 also includes a gas turbine 130 coupled to common compressor/turbine shaft 106. In one embodiment, GT system 102 may be a MS7001FB engine, sometimes referred to as a 9FB engine, commercially available from General Electric Company, Greenville, S.C. The present disclosure is not limited to any one particular GT system and may be implanted in connection with other engines including, for example, the MS7001FA (7FA) and MS9001FA (9FA) engine models of General Electric Company.

In operation, air enters the inlet of compressor 120, is compressed and then discharged to combustor 124 where fuel, such as a gas, e.g., natural gas, or a fluid, e.g., oil, is burned to provide high energy combustion gases which drive gas turbine 130. In gas turbine 130, the energy of the hot gases is converted into work, some of which is used to drive compressor 120 through rotating shaft 106, with the remainder available for useful work to drive a load such as generator 104 via shaft 106 for producing electricity.

FIG. 1 also represents CCPP 100 in its simplest form in which the energy in the exhaust gases exiting gas turbine 130 are converted into additional useful work. The exhaust gases enter heat exchanger 108, in the form of an HRSG, in which water is converted to steam in the manner of a boiler. Heat exchanger 108 may also use the energy to create a hot feedwater, e.g., having temperature in the range of 95° C. to 99° C.

Heat exchanger 108 may take the form of a once-through, duct-fired HRSG, which indicates that combustion gases pass through the heat exchanger once and that supplemental heating of combustion gases may be provided, e.g., within ducts 109 through which combustion gases from GT system 102 pass to heat exchanger 108. The supplemental heated combustion gases are indicated as working fluid (or just "fluid") 142 herein.

ST system 110 may include one or more steam turbines. For example, ST system 110 may include a high pressure (HP) turbine 132, an intermediate pressure (IP) turbine 134 and a low pressure (LP) turbine 136, each of which are coupled to shaft 106. Each steam turbine 132, 134, 136 includes a plurality of rotating blades (not shown) mechanically coupled to shaft 106. In operation, steam from heat exchanger 108 and perhaps other sources, enters an inlet of HP turbine 132, IP turbine 134 and/or LP turbine 136, and is channeled to impart a force on blades thereof causing shaft 106 to rotate. As understood, steam from an upstream turbine may be employed later in a downstream turbine. The steam thus produced by heat exchanger 108 drives at least a part of ST system 110 in which additional work is extracted to drive shaft 106 and an additional load such as second generator 112, which, in turn, produces additional electric power. In some configurations, turbines 130, 132, 134, 136 drive a common generator.

FIG. 1 also shows a CCPP control system 138 operatively coupled to the GT system 102, the HRSG 108, and the ST system 110. Control system 138 may include any now known or later developed computerized controller for providing automated control of CCPP 100.

Figure 2:
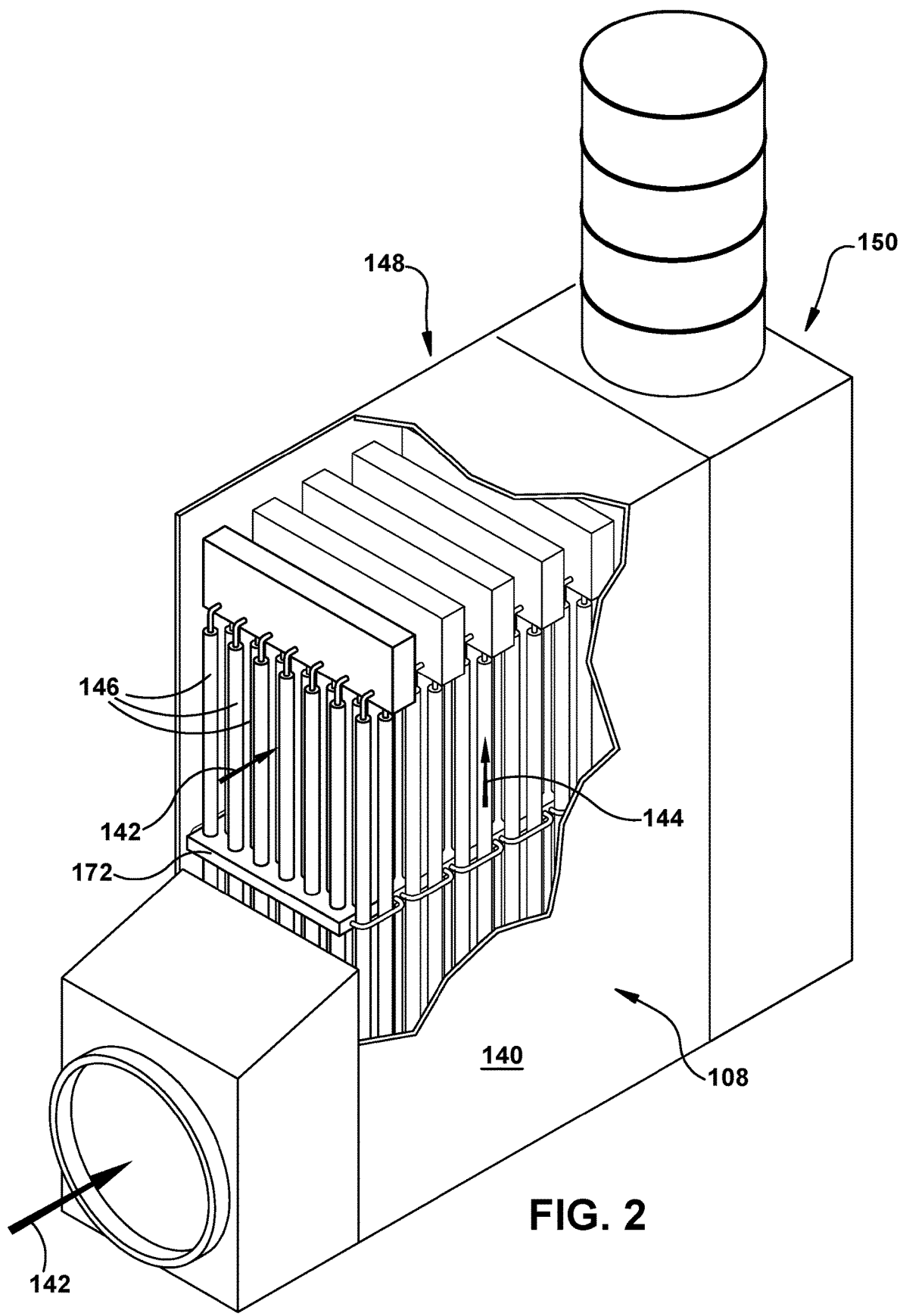
FIG. 2 shows a partially transparent perspective view of a heat exchanger in the form of a heat recovery steam generator with vertical heat exchange tubes, according to one embodiment of the disclosure.

FIG. 2 shows a partially transparent, perspective view of an embodiment of heat exchanger 108. Heat exchanger 108 is illustrated as an HRSG configured to couple to GT system 102 (FIG. 1) and to deliver steam to, e.g., ST system 110 (FIG. 1), and/or heated water to other parts of CCPP 100 (FIG. 1). As illustrated, heat exchanger 108 includes an insulated casing 140 (hereinafter "casing 140") configured to contain fluid 142. Casing 140 may be housed in an HRSG enclosure 148. Casing 140 may include any now known or later developed insulated duct configured to contain fluid 142, e.g., with a carbon steel or stainless steel inner liner, insulation layer and outer carbon steel layer.

Fluid 142 may be any form of gas having a heat differential with a fluid 144 (shown by arrows only) passing through a plurality of heat exchange tubes 146 of heat exchanger 108. As noted, fluid 142 may include exhaust combustion gases from GT system 102, which may or may not be exposed to supplement heating in ducts 109 (FIG. 1). Heat is exchanged between fluid 142 and fluid 144. Fluid 142 may be combustion gas exhaust from GT system 102 (FIG. 1), and fluid 144 may be a liquid, e.g., water, and/or gas, e.g., steam. Fluid 142 passes over and around the exterior surfaces of a plurality of heat exchange tubes 146 and exits casing 140 via an exhaust system 150 (FIG. 2), e.g., a stack and/or scrubber, etc., while fluid 144 passes through the interior of the plurality of heat exchange tubes 146. Enclosure 148 may include any now known or later developed structural protection, e.g., a building or other physical protection.

In the example of FIGS. 2 and 4-6, heat exchange tubes 146 (hereinafter "tubes 146") extend in a vertical direction, and fluid 142 passes thereabout in a generally horizontal direction. As used herein, "generally" as applied to a flow direction of fluid 142 indicates that the fluid usually travels in the stated direction with some minor or temporary deviations as it passes over or about tubes 146 that may impede its path.

Tubes 146 may have any now known or later developed form of heat exchange tubes and may be made of any material capable of providing the desired heat transfer characteristics, flexibility, and ability to withstand the environment in which exposed. Tubes 146 may vary in size depending on application, e.g., in some applications varying from 1.25 inches to 2.0 inches in outer diameter. In one embodiment, tubes 146 may take on any form as described in co-pending U.S. patent application Ser. No. 16/230,736, filed Dec. 14, 2018, which is hereby incorporated by reference.

Figure 3:
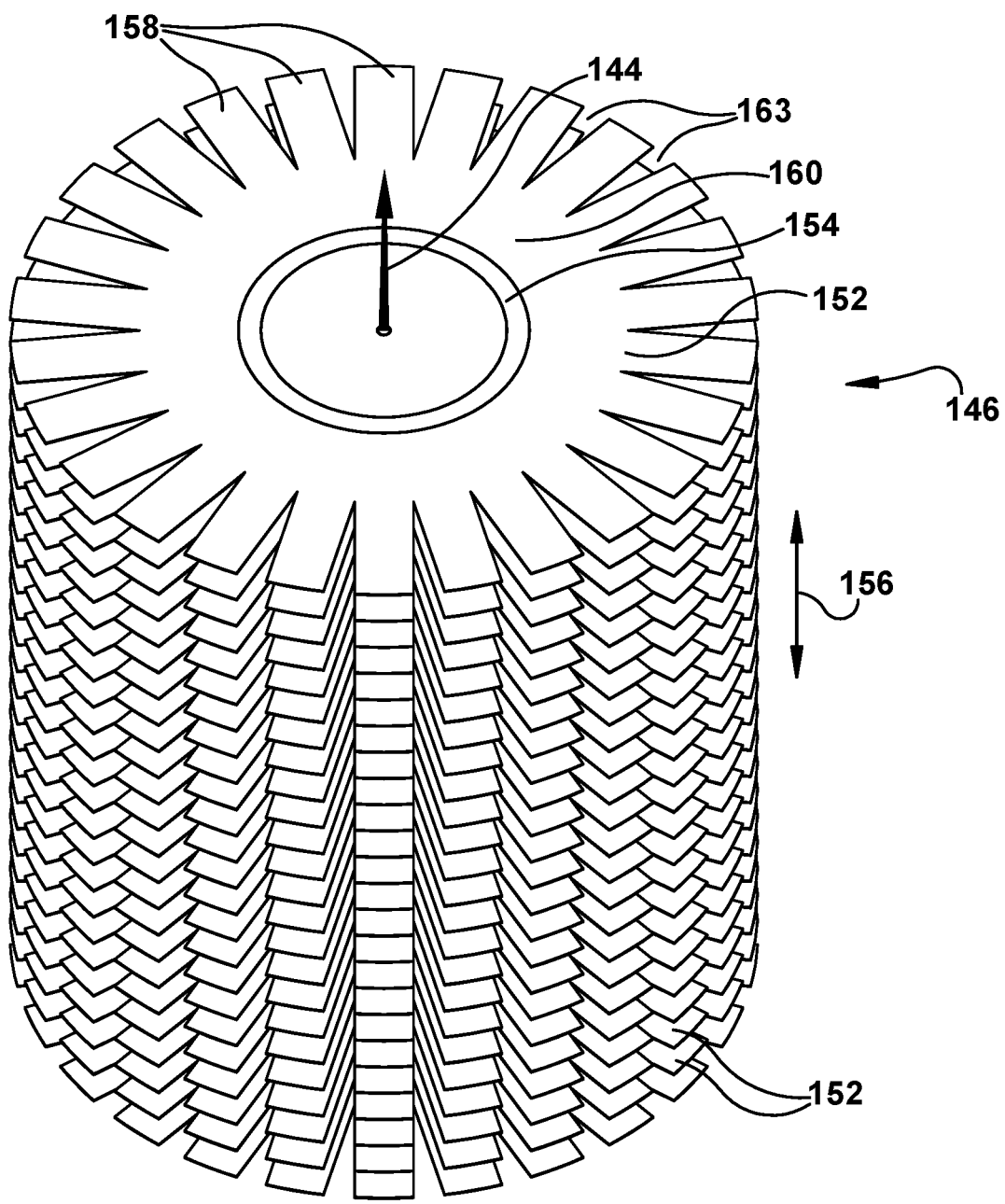
FIG. 3 shows a perspective view of an illustrative heat exchange tube.

FIG. 3 shows a perspective view of one embodiment of a finned tube from the noted application. As illustrated, tubes 146 may include a plurality of disks 152 disposed around a center tube 154 aligned in a longitudinal direction 156. Each disk 152 may be substantially planar and may be stacked such that it is disposed longitudinally above and/or below at least one adjacent disk 152. Center tube 154 may include any now known or later developed tubular member configured to allow fluid 144 to pass therethrough, e.g., by pumping or other force. Each disk 152 may include a plurality of fin segments 158 extending radially outward from a disk center portion 160. Disk center portion 160 extends circumferentially around the outer circumference of center tube 154. Each of fin segments 158 is separated from an adjacent fin segment 158 by a serration 162. Fin segments 158 of adjacent disks can be circumferentially and/or longitudinally aligned or circumferentially and/or longitudinally offset. Fin segments 158 may be arranged in a spiral configuration, an alternating pattern, and/or a random configuration relative to the fin segments 158 longitudinally above and/or below them.

Disk(s) 152 may be at least partially composed of aluminum and/or other thermally conductive materials such as beryllium, copper, gold, magnesium, iridium, molybdenum, rhodium, silver, tungsten, and/or other suitable materials, as well as alloys thereof. Center tube 154 may be at least partially composed of carbon steel, alloy steel, stainless steel, ferritic stainless, austenitic stainless, and/or other materials that are sufficiently thermally conductive, stress tolerant, and temperature resistant.

In some embodiments, an HRSG may include center tubes 154 in the superheater and/or evaporate sections (not labeled) that are composed of materials that are resistant to higher temperatures (for example, 1100° F.). The HRSG may also include center tubes 154 in the economizer and/or evaporate sections (not labeled) that are composed of materials that have lower temperature resistance and higher thermal conductivity. While one example of a tube 146 has been described, it is understood that heat exchanger tubes can take a variety of alternative forms.

Figure 4:
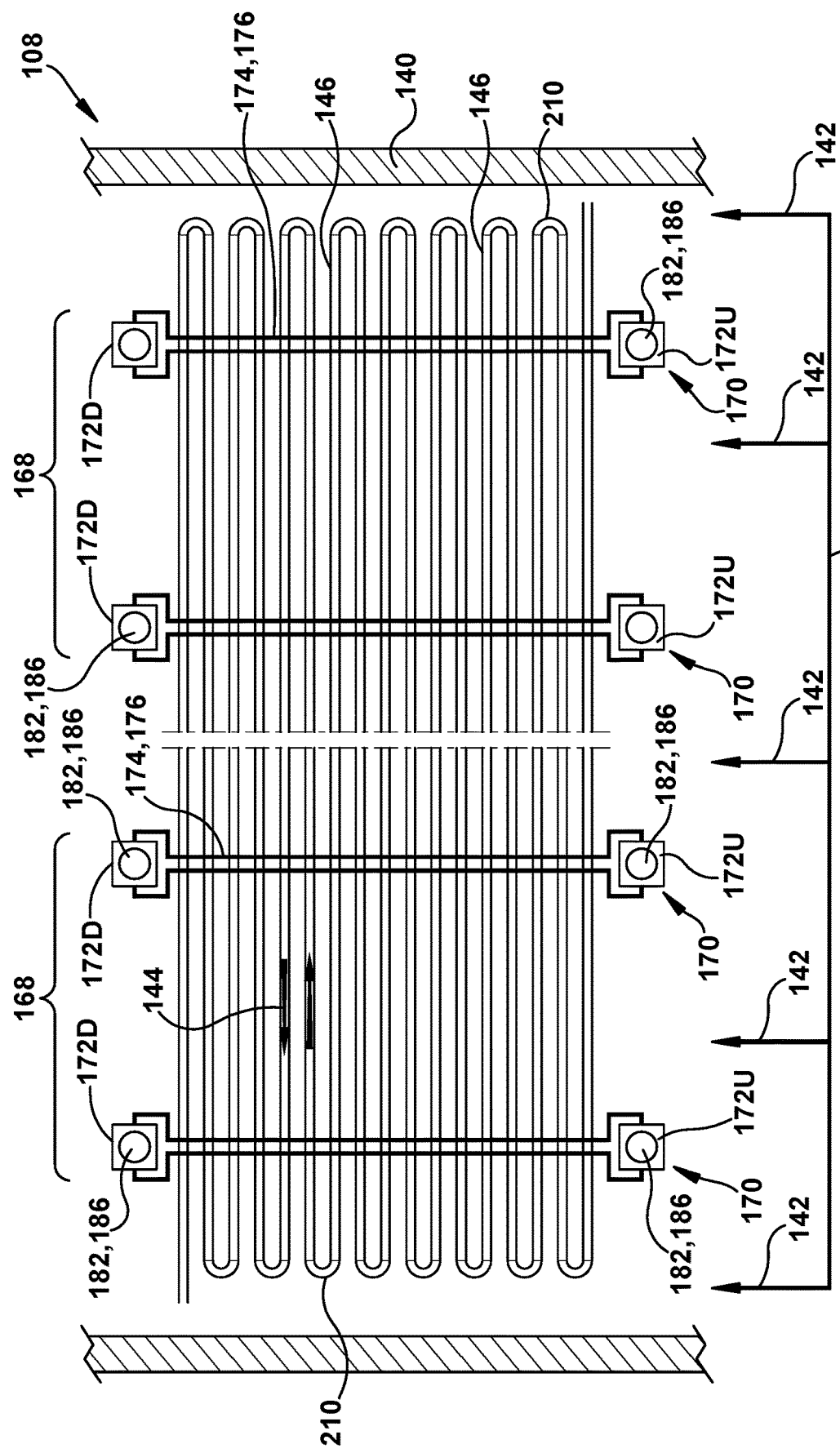
FIG. 4 shows a schematic plan view of a plurality of heat exchange sections in a heat exchanger, according to embodiments of the disclosure.

FIG. 4 shows a schematic plan view of heat exchanger 108 including at least one at least one heat exchanger (HE) section 168 in casing 140, according to embodiments of the disclosure. Heat exchanger 108 may include any number of laterally adjacent HE sections 168 configured to span a substantial portion (e.g., most, if not all) of a working fluid path 164. Fluid 142 may flow along working fluid path 164. The size or width of working fluid path 164 and the number of HE sections 168 may vary depending on, for example, the size of heat exchanger 108, the type of fluid 142, and a number of other factors.

Figure 5:
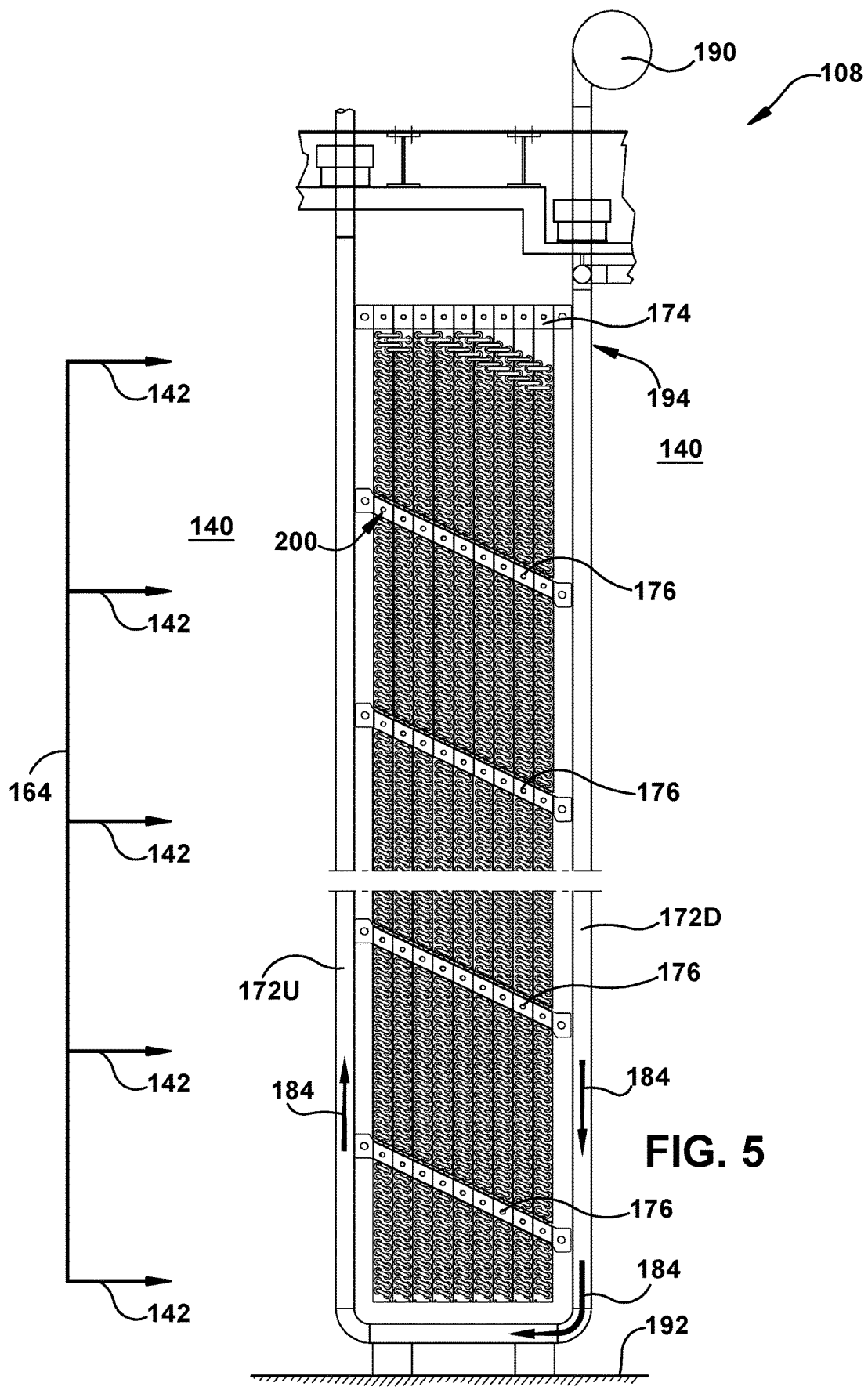
FIG. 5 shows schematic side view of a heat exchange section from FIG. 4, according to embodiments of the disclosure.
Figure 6:
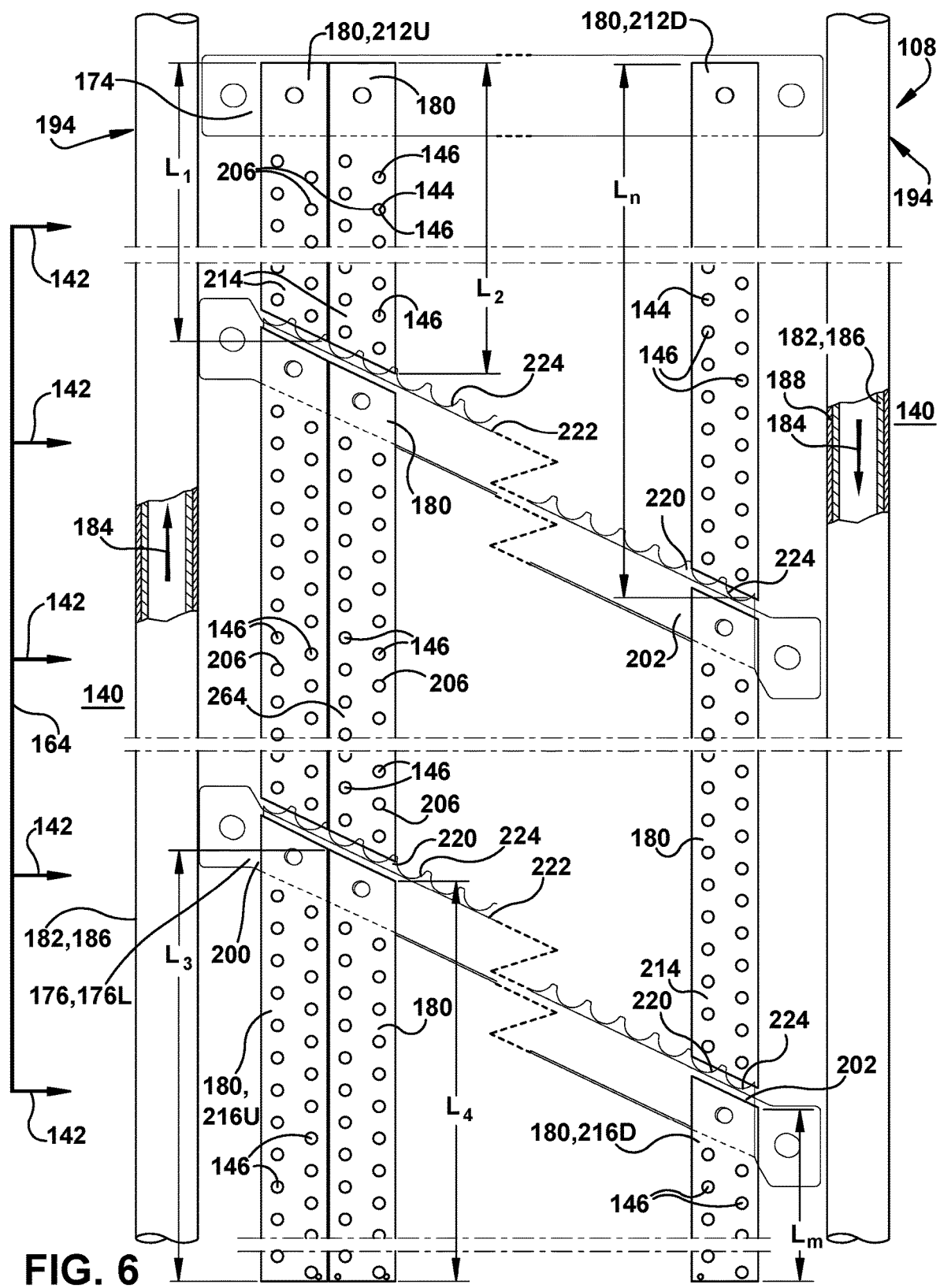
FIG. 6 shows an enlarged side view of a portion of a heat exchange section including cross-supports and tube positioners, according to embodiments of the disclosure.

FIG. 5 shows a schematic side view of one HE section 168, and FIG. 6 shows an enlarged, partial side view of a number of cross-supports 174, 176 and tube positioners 180 of an HE section 168, according to embodiments of the disclosure. Each HE section 168 may include a pair of spaced supports 170 (as shown in FIG. 4), with each support 170 including an upstream support 172U and a downstream support 172D. A first cross-support 174 couples to and extends between respective upstream and downstream supports 172U, 172D. In contrast to conventional heat exchangers, heat exchanger 108 also may include at least one second cross-support 176 coupled to and extending between respective upstream and downstream supports 172U, 172D.

As will be further described, each cross-support 174, 176 includes a plurality of tube positioners 180 suspended therefrom. Each tube positioner 180 positions a plurality of tubes 146 extending across at least a portion of working fluid path 164 through casing 140. Thus, tube positioners 180 create what may be referred to as 'tube sheets'. Collectively, tube positioners 180 support tubes 146 to create a curvilinear or serpentine path through which fluid 142 passes to transfer heat between fluid 142 and fluid 144 passing through tubes 146.

As shown in FIGS. 4-6, upstream support 172U and/or downstream support 172D may include a coolant carrying body 182 configured to direct a coolant 184 (FIGS. 5 and 6) therethrough. Coolant carrying body 182 may include a tubular member 186 (e.g., a steel pipe) through which coolant 184 may pass. The exterior surface of tubular member 186 can be protected by any appropriate insulation 188 (FIG. 6 only), e.g., a ceramic fiber blanket. Coolant 184 may include any fluid having a temperature lower than fluid 142 and may include water and/or a gas, like air. In the illustrative once-through, duct-fired HRSG application, coolant 184 may include, for example, HP turbine 132 (FIG. 1) economizer water; however, other options are also possible.

As shown in FIG. 5, in one example, tubular member 186 of each support 172U, 172D may be fluidly coupled so coolant 184 may circulate between the supports 172U, 172D. However, this is not necessary in all instances, as each support 172U, 172D may be independent of one another. In another example, coolant 184 may pass through only one of supports 172U, 172D. In any event, heat exchanger 108 may include an appropriate pumping system 190 (FIG. 5 only) configured to pass coolant 184 through coolant carrying body(ies) 182. Coolant 184 cools upstream and downstream support(s) 172U, 172D and at least part of first cross-support 174 and, optionally, second cross-support(s) 176. Supports 172U, 172D may be fixed to any structure appropriate to support cross-supports 174, 176 and tube positioners 180, e.g., a floor 192 of enclosure 148.

As shown best in FIGS. 5 and 6, each first cross-support 174 is coupled to and extends between respective upstream and downstream supports 172U, 172D. First cross-supports 174 may be coupled to supports 172U, 172D in any manner, e.g., fasteners, welding, etc. As shown in FIG. 6, cross-support 174 may extend through insulation 188 for direct thermal contact with tubular member 186. First cross-supports 174 may extend substantially horizontally between supports 172U, 172D at an uppermost end 194 of the respective upstream and downstream supports. Each first cross-support 174 may provide an uppermost cross-support of each HE section 168.

Any number of second cross-supports 176 may be coupled to and extend between upstream and downstream supports 172U, 172D below each first cross-support 174. That is, any number of vertically spaced second cross-supports 176 can be used to create any height of heat exchanger desired. Each second cross-support 176 is vertically distanced from an adjacent cross-support thereabove, i.e., either first cross-support 174 or another second cross-support 176. Each second cross-support 176 has an upstream end 200 coupled to upstream support 172U and a downstream end 202 coupled to downstream support 172D. Second cross-supports 176 may be coupled to supports 172U, 172D in any manner, e.g., fasteners, welding, etc. As shown in FIG. 6, cross-supports 176 may extend through insulation 188 for direct thermal contact with tubular member 186. In contrast to first cross-supports 174, upstream end 200 of second cross-supports 176 is vertically higher than a respective downstream end 202 thereof, creating an attack angle $\alpha$ with working fluid path 164 for the respective second cross-supports. Attack angle $\alpha$ may be, for example, between approximately 20° to 40° relative to working fluid path 164, e.g., relative to horizontal.

Heat exchange tubes 146 of heat exchanger 108 are positioned by a plurality of tube positioners 180 suspended from each cross-support 174, 176. Tube positioners 180 each position a plurality of heat exchange tubes 146 extending across at least a portion of working fluid path 164. As understood in the field, heat exchange tubes 146 run into and out of the page in FIGS. 5-6 and have U-shaped connectors 210 (FIG. 4) coupling ends of pairs thereof to create a cooling circuit through which fluid 144 may flow. Fluid 144 may be transmitted through heat exchange tubes 146 in any now known or later developed fashion, e.g., pumping, expansion through gasification of liquid, etc.

Tube positioners 180 may include plates of a ferritic material (e.g., steel) that are coupled to respective cross-supports 174, 176, e.g., by fasteners or welding. Each tube positioner 180 includes a plurality of spaced openings 206 with each opening 206 configured to position a respective heat exchange tube 146. Openings 206 may be arranged in any manner to foster the desired heat exchange between fluids 142, 144, e.g., they may be staggered to create a curved or serpentine working fluid path 164 through heat exchange tubes 146. For example, each tube positioner 180 may position a plurality of heat exchange tubes 146 in a vertical plane V (lower left in FIG. 6); however, vertical alignment may not be desired in all instances.

Any number of tube positioners 180 may be supported by a respective cross-support 174, 176 to create any desired depth of working fluid path 164 with heat exchange tubes 146. It is noted that tube positioners 180 are shown in a spaced manner for clarity in FIG. 6; they may be in relatively close proximity (less than an inch) as shown in FIG. 5.

As shown in FIG. 6, to accommodate the attack angle of second cross-supports 176, tube positioners 180 supported by first cross-support 174 and all second cross-supports 176 except for a lowermost second cross-support 176L may have progressively longer lengths from an upstream-most tube positioner 212U to a downstream-most tube positioner 212D. That is, length L1 of upstream-most tube positioner 212U <L2 of adjacent tube positioner . . . <length Ln of downstream-most tube positioner 212D.

In addition, tube positioners 180 may each have a lowermost end 214 angled to substantially match the attack angle α of second cross-support 176, if any, therebelow. In this fashion, thermal expansion of tube positioners 180 during operation will maintain a uniform spacing with respective adjacent second cross-supports 176. In order to accommodate the attack angle of a lowermost second cross-support 176L and provide heat exchange tubes 146 in a uniform fashion with the rest of heat exchanger 108, tube positioners 180 supported by lowermost second cross-support 176L may have progressively shorter lengths from an upstream-most tube positioner 216U to a downstream-most tube positioner 216D. That is, length L3 of upstream-most tube positioner 216U >length L4 of adjacent tube positioner . . . >length Lm of downstream-most tube positioner 216D.

Each support 172, cross-support 174, 176, and tube positioner 180 can be made of any material capable of withstanding the environment within heat exchanger 108. However, use of cooled supports 172 and the distribution of the load of heat exchange tubes 146 amongst a number of vertically spaced cross-supports 174, 176 allow use of a ferritic material (such as steel) for supports 172, cross-supports 174, 176, and tube positioners 180, even where supplemental heating is provided. This arrangement reduces costs and manufacturing complexity and allows use of ferritic material rather than more costly and hard-to-manufacture, high-grade material in, for example, a once-through, duct-fired HRSG.

As shown in FIG. 6, heat exchanger 108 may also optionally include a heat exchange tube positioning member 220 (hereinafter "positioning member 220") on an upper surface 222 of at least one second cross-support 176. Positioning member(s) 220 may include a seat 224 for positioning a plurality of lowermost heat exchange tubes 146 supported by a vertically-above cross-support 174 or 176. Any number of seats 224 may be provided. Seats 224 are sized and shaped to receive heat exchange tubes 146 without damaging the tubes, e.g., to receive an outer diameter of disks 152 (FIG. 3). In this fashion, as thermal expansion causes tube positioners 180 to expand, positioning members 220 may assist in retaining lateral positioning of the positioners and their respective heat exchange tubes 146. While a number of positioning members 220 are shown, they may be provided as single member extending along upper surface 222 of a respective cross-support 176, e.g., creating a one-piece scalloped positioning member.

Figure 7:
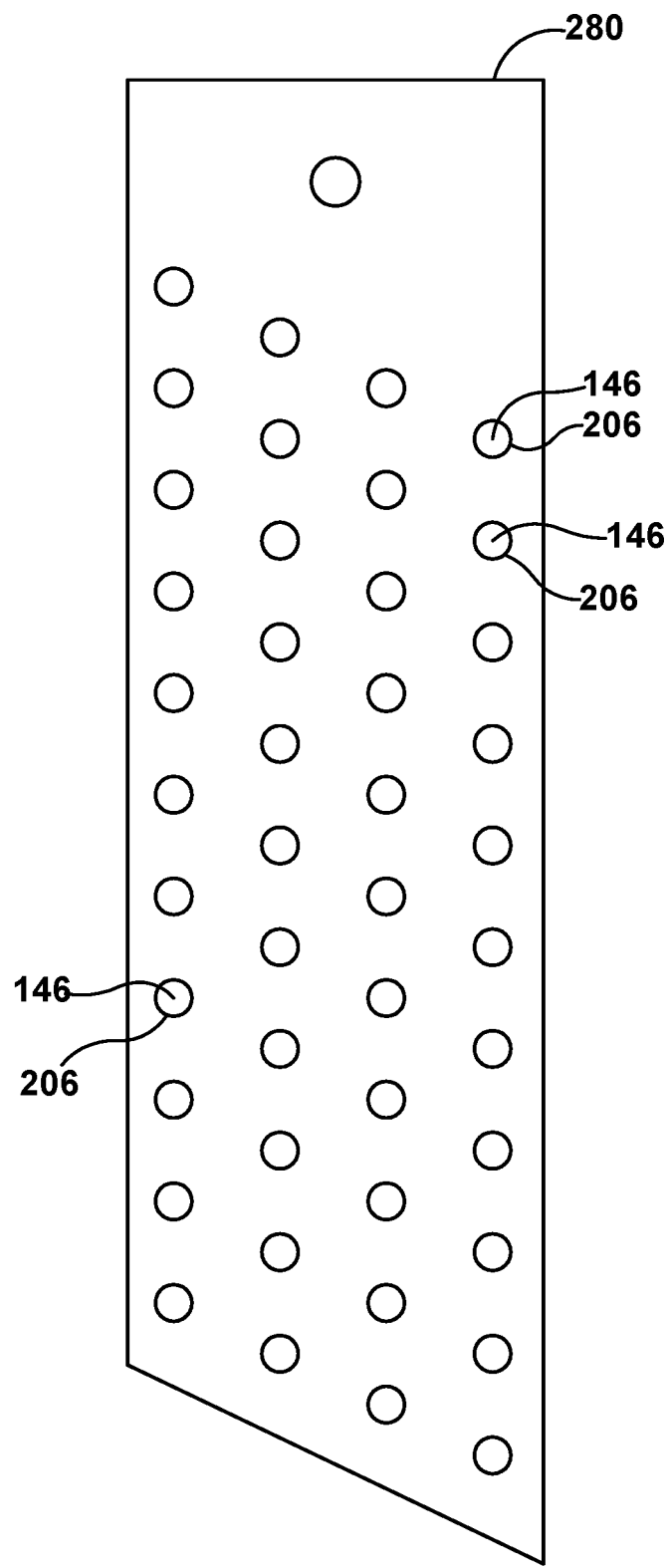
FIG. 7 shows a side view of a tube positioner including more than one column of vertically spaced pairs of heat exchange tubes, according to alternative embodiments of the disclosure.

Referring to FIG. 6, tube positioners 180 are shown with a single column of vertically spaced pairs of heat exchange tubes 146. Due to the cooling and distribution of load provided by embodiments of the disclosure, in other embodiments as shown in FIG. 7, more than one vertical column of spaced pairs of heat exchange tubes 146 may be provided on a particular tube positioner 280. Providing more than a single column of vertically spaced pairs of heat exchange tubes 146 on each tube positioner 280 can reduce the number of tube positioners required and, hence, the manufacturing time and costs to create a heat exchanger 108. As also shown in FIG. 6, each cross-support 174, 176 is coupled to respective upstream and downstream supports 172U, 172D at a location outside a periphery of the plurality of heat exchange tubes 146, which makes manufacturing heat exchanger easier, less time consuming and less expensive compared to conventional heat exchangers.

Use of tube positioners to support heat exchange tubes 146 and the use of cooling support(s) 172 provides a number of advantages compared to conventional heat exchangers. For example, the distribution of the load to a number of vertically spaced cross-supports makes manufacturing a heat exchanger easier, less time consuming and less expensive compared to conventional heat exchangers. Further, any thermal growth experienced during operation is separated by each cross-support and does not extend top to bottom of the tube sheets, as in conventional heat exchangers. As a result, ferritic material can be used rather than austenitic or other high-grade material, such as Inconel. Supports 172, cross-supports 174, 176, and tube positioners 180 can all be made of a ferritic material, reducing costs and manufacturing complexity. Placing more heat exchange tubes 146 on each tube positioner 280, as shown in FIG. 7, can also reduce manufacturing time, complexity and costs. Collectively, the distribution of the load to a number of vertically spaced cross-supports and the cooling of supports 172 and cross-supports 174, 176 allows exposure of heat exchanger 108 to hotter temperature fluid 142, e.g., those with supplemental heating like a once-through, duct-fired HRSG in CCPP 100 (FIG. 1). Thus, heat exchanger 108 can be used with a duct-fired HRSG that runs with hotter gases on legacy HRSGs that have horizontal flow. Heat exchanger 108 can also be used in a wide variety of applications outside of an HRSG.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application and to enable others of ordinary skill in the art to understand the disclosure for various embodiments with various modifications as are suited to the particular use contemplated.

What is claimed is:

1. A heat exchanger, comprising:
    a casing configured to direct a working fluid therethrough; and
    at least one heat exchanger (HE) section in the casing, each HE section including a pair of spaced supports, each spaced support including:
        an upstream support and a downstream support, wherein at least one of the upstream support and the downstream support includes a coolant carrying body configured to direct a coolant therethrough;
        a first cross-support coupled to and extending between respective upstream and downstream supports;
        at least one second cross-support coupled to and extending between the respective upstream and downstream supports, each second cross-support of the at least one second cross-support vertically distanced from an adjacent cross-support thereabove; and
        a plurality of tube positioners suspended from each of the cross-supports, each tube positioner positioning a plurality of heat exchange tubes extending across at least a portion of a working fluid path through the casing,
    wherein each second cross-support of the at least one second cross-support has an upstream end coupled to the upstream support and a downstream end coupled to the downstream support, wherein the upstream end is vertically higher than the downstream end, creating an attack angle with the working fluid path for the respective second cross-support.

2. The heat exchanger of claim 1, further comprising a pumping system configured to pass the coolant through each coolant carrying body, wherein the coolant cools the at least one of the upstream and downstream supports and at least part of at least one of the first and second cross-supports.

3. The heat exchanger of claim 1, wherein each first cross-support extends substantially horizontally between respective upstream and the downstream supports at an uppermost end of the respective upstream and downstream supports.

4. The heat exchanger of claim 1, wherein each tube positioner positions the plurality of heat exchange tubes in a vertical plane.

5. The heat exchanger of claim 1, wherein the at least one second cross-support comprises a plurality of second cross-supports; and wherein the plurality of tube positioners supported by the first cross-support have progressively longer lengths from an upstream-most tube positioner to a downstream-most tube positioner.

6. The heat exchanger of claim 5, wherein the plurality of tube positioners, except for the lowermost tube positioners, each have a lowermost end angled to substantially match the attack angle of the respective second cross-support therebelow.

7. The heat exchanger of claim 5, wherein the plurality of tube positioners supported by the lowermost second cross-support have progressively shorter lengths from an upstream-most tube positioner to a downstream-most tube positioner.

8. The heat exchanger of claim 5, further comprising a heat exchange tube positioning member on an upper surface of at least one second cross-support, wherein the heat exchange tube positioning member includes a seat for positioning a plurality of lowermost heat exchange tubes supported by a vertically-above cross-support.

9. The heat exchanger of claim 1, wherein the coolant includes water.

10. The heat exchanger of claim 1, wherein the at least one HE section includes a plurality of laterally adjacent HE sections configured to span a substantial portion of the working fluid path.

11. The heat exchanger of claim 1, wherein the heat exchanger is part of a once-through, duct-fired heat recovery steam generator of a combined cycle power plant.

12. The heat exchanger of claim 1, wherein each pair of spaced supports, the cross-supports, and the plurality of tube positioners are made of a ferritic material.

13. The heat exchanger of claim 1, wherein each cross-support of the first cross-support and the at least one second cross-support is coupled to respective upstream and downstream supports at a location outside a periphery of the plurality of heat exchange tubes.

14. A once-through, duct-fired heat recovery steam generator (HRSG) of a combined cycle power plant, the once-through duct-fired HRSG comprising:
    a casing configured to direct a working fluid therethrough; and
    a plurality of laterally adjacent heat exchanger (HE) sections configured to span a substantial portion of the working fluid path, each HE section including a pair of spaced supports, each spaced support including:
        an upstream support and a downstream support, wherein at least one of the upstream support and the downstream support includes a coolant carrying body configured to direct a coolant therethrough;
        a first cross-support coupled to and extending between respective upstream and downstream supports;
        at least one second cross-support coupled to and extending between the respective upstream and downstream supports, each second cross-support of the at least one second cross-support vertically distanced from an adjacent cross-support thereabove; and a plurality of tube positioners suspended from each cross-support, each tube positioner positioning a plurality of heat exchange tubes extending across at least a portion of a working fluid path through the casing;

wherein each tube positioner positions a plurality of heat exchange tubes in a vertical plane; and wherein each pair of spaced supports, the cross-supports, and the plurality of tube positioners are made of a ferritic material, wherein the at least one second cross-support comprises a plurality of second cross-supports, wherein each second cross-support of the plurality of second cross-supports has an upstream end coupled to the upstream support and a downstream end coupled to the downstream support, wherein the upstream end is vertically higher than the downstream end, creating an attack angle with the working fluid path for the respective second cross-support.

15. The once-through, duct-fired HRSG of claim 14, further comprising a pumping system configured to pass the coolant through each coolant carrying body, wherein the coolant cools the at least one of the upstream and downstream supports and at least part of at least one of the first and second cross-supports.

16. The once-through, duct-fired HRSG of claim 14, wherein each first cross-support extends substantially horizontally between respective upstream and the downstream supports at an uppermost end of the respective upstream and downstream supports; and wherein the plurality of tube positioners supported by the first cross-support and all second cross-supports of the plurality of second cross-supports except for a lowermost second cross-support have progressively longer lengths from an upstream-most tube positioner to a downstream-most tube positioner.

17. The once-through, duct-fired HRSG of claim 16, wherein the plurality of tube positioners except for the plurality of tube positioners supported by a lowermost second cross-support each have a lowermost end angled to substantially match the attack angle of the respective second cross-support therebelow; and wherein the plurality of tube positioners supported by the lowermost second cross-support have progressively shorter lengths from an upstream-most tube positioner to a downstream-most tube positioner.

18. The once-through, duct-fired HRSG of claim 14, further comprising a heat exchange tube positioning member on an upper surface of the at least one second cross-support, wherein the heat exchange tube positioning member includes a seat for positioning a plurality of lowermost heat exchange tubes supported by a vertically-above cross-support.

19. The once-through, duct-fired HRSG of claim 14, wherein each cross-support of the first cross-support and the at least one second cross-support is coupled to respective upstream and downstream supports at a location outside a periphery of the plurality of heat exchange tubes.

* * * * *